Patented Apr. 22, 1941

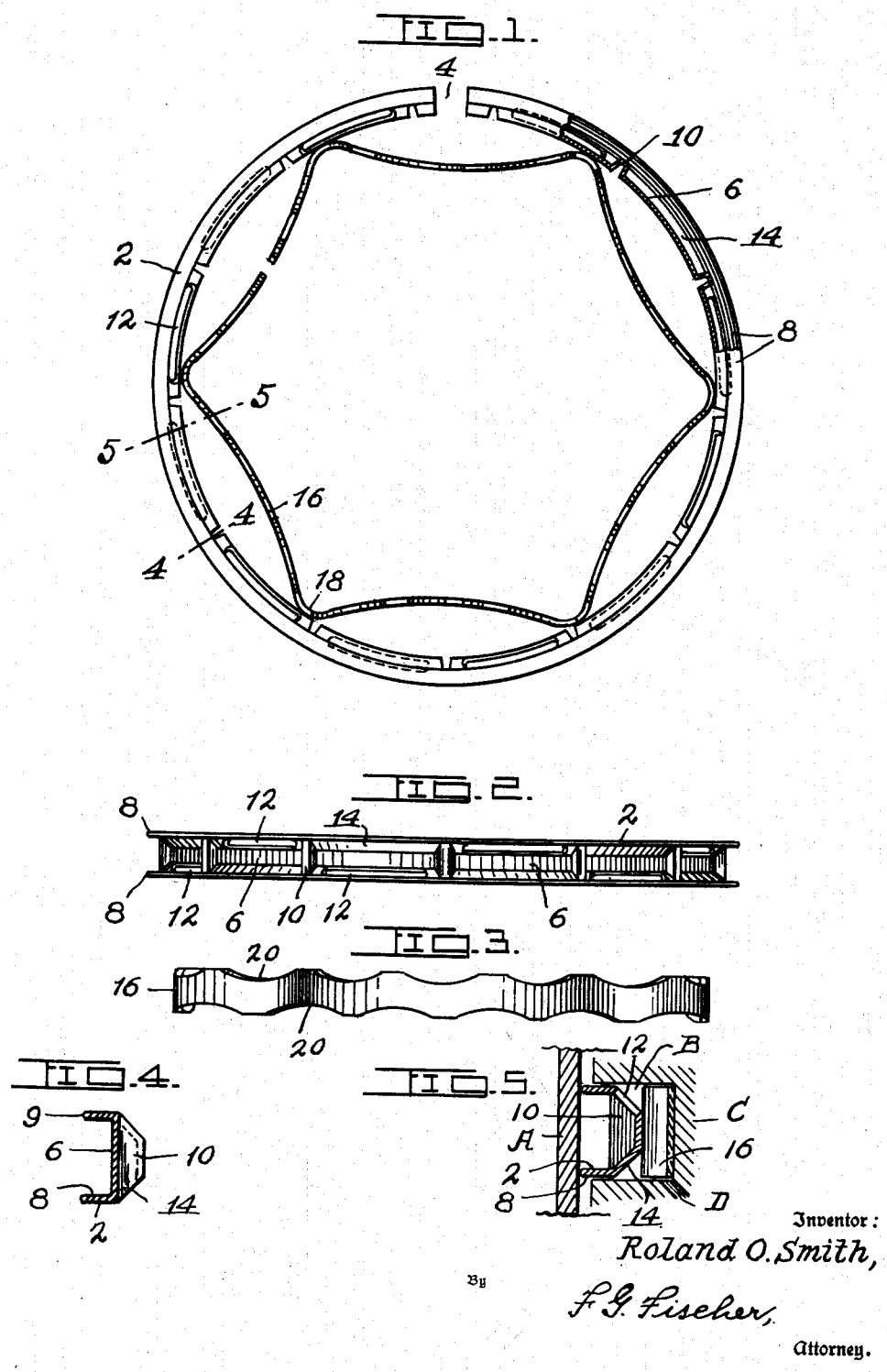

2,239,376

UNITED STATES PATENT OFFICE 2,239,376

PISTON RING

Roland O. Smith, Kansas City, Mo.

Application April 1, 1940, Serial No. 327,206

2 Claims. (Cl. 309—45)

My invention relates to improvements in piston rings of the type used on the pistons of internal combustion engines for scraping surplus lubricating oil from the cylinder walls, and one object is to provide a simple, efficient and durable one-piece piston-ring which is well adapted for the purpose intended.

A further object is to provide a piston ring having ample drainage so that the surplus oil scraped from the cylinder walls will be free to flow back into the crank case of engine through the holes formed in the grooved portions of the pistons for that purpose.

Another object is to provide a one-piece piston ring which is reinforced in such manner as to successfully withstand the shock to which it is subjected by explosions of the combustible mixture in the combustion chamber.

A further object is to provide a piston ring having sufficient flexibility to enable it to be expanded by an expander ring, so that its periphery will snugly fit the cylinder wall and provide an efficient seal against the downward passage of gas from the combustion chamber or the upward passage of surplus oil.

Other objects will hereinafter appear and in order that the invention may be fully understood, reference will now be had to the accompanying drawing, in which:

Fig. 1 is a side elevation of the piston ring with an expansion ring associated therewith to press it outward against the wall of a cylinder.

Fig. 2 is an edge view of the piston ring.

Fig. 3 is an edge view of the expansion ring.

Fig. 4 is a cross section of the piston ring on line 4—4 of Fig. 1.

Fig. 5 is a cross section of the piston ring and the expansion ring on line 5—5 of Fig. 1 associated with portions of a piston and a cylinder.

As shown by the drawing, 2 designates a piston ring formed preferably from one piece of steel or other suitable material. To render the ring resilient so that it may be expanded or contracted within limits, it is split at one point as indicated at 4, Fig. 1. Preferably the ring is split transversly as shown to provide butt ends, but if preferred it may be split on the bias so that the ends may overlap.

As shown more clearly by Figs. 4 and 5 the ring is of U-cross sectional configuration to provide an annular body portion 6 and a pair of outturned marginal flanges 8 which are parallel to each other and extend circumferentially around the body portion as shown by Fig. 1. As shown by Figs. 2, 4 and 5 the edges of the flanges 8 are rounded transversely as indicated at 9 to avoid sharp corners which might mar the inner surface of the associated cylinder wall A.

The body portion 6 and the flanges 8 are reinforced with transverse ribs 10 pressed outwardly from the body portion and spaced between the ends of a plurality of slots 12 which provide for ample drainage of surplus oil scraped from the cylinder wall. The slots 12 are preferably arranged in staggered relation to each other in the body portion 6 as shown by Fig. 2 to prevent undue weakening of the ring.

In order to provide for free drainage of the surplus oil the marginal parts of the body portion 6 are beveled as indicated at 14 to avoid all danger of the slots 12 becoming clogged, as might be the case if they were located in close relation with the expansion ring 16 or the walls of the groove B formed in the piston C for reception of the piston ring.

As shown by Fig. 3 the expansion ring 16 is of polygonal formation so that its corners 18 will press against and expand the piston ring 2 to hold it in close contact with the inner surface of the cylinder A and thereby prevent the passage of gas or oil between the piston and the cylinder wall. When installed in the groove B of the piston the expansion ring 6 of course assumes a nearly circular form to approximately conform to the circular wall of the groove B, but its corners 18 only will bear against the inner periphery of the ring 2. As shown by Fig. 3 the margins of the expansion ring 16 have staggered recesses 20 so that the surplus oil scraped from the cylinder wall by the flanges 8 may freely flow to the perforations D extending from the lower corner of groove B to the interior of the piston.

By forming the piston ring 2 in one piece as shown and described it is apparent that it will be more durable and can be installed in the groove of a piston more readily and accurately than a ring comprising two or more pieces, and is less likely to become disarranged from the force of the explosions when the engine is in operation. It is also apparent that by reinforcing the piston with the ribs 10 that the flanges 6 will be sustained against the objectionable fluttering action which occurs in a plural piece spring in which the flanges are separated from the body of the ring.

While I have shown and described the preferred form of my piston ring I reserve all rights to such other forms and modifications thereof as properly fall within the spirit and scope of the invention as claimed.

Having thus described my invention, what I claim and desire to secure by Letters Patent, is:

1. A one-piece piston ring comprising a body portion provided with oppositely disposed beveled portions having slots alternately arranged therein, a pair of outturned flanges formed integral with said beveled portions, and a plurality of transverse ribs pressed outwardly from said body portion.

2. A split one-piece piston ring comprising a body portion provided with oppositely disposed beveled portions having slots alternately arranged therein, transverse ribs pressed outwardly from said body portion and spaced between the ends of the slots, and a pair of parallel outturned flanges formed integral with the beveled portions and provided with transversely rounded edges.

ROLAND O. SMITH.